Patented Mar. 24, 1931

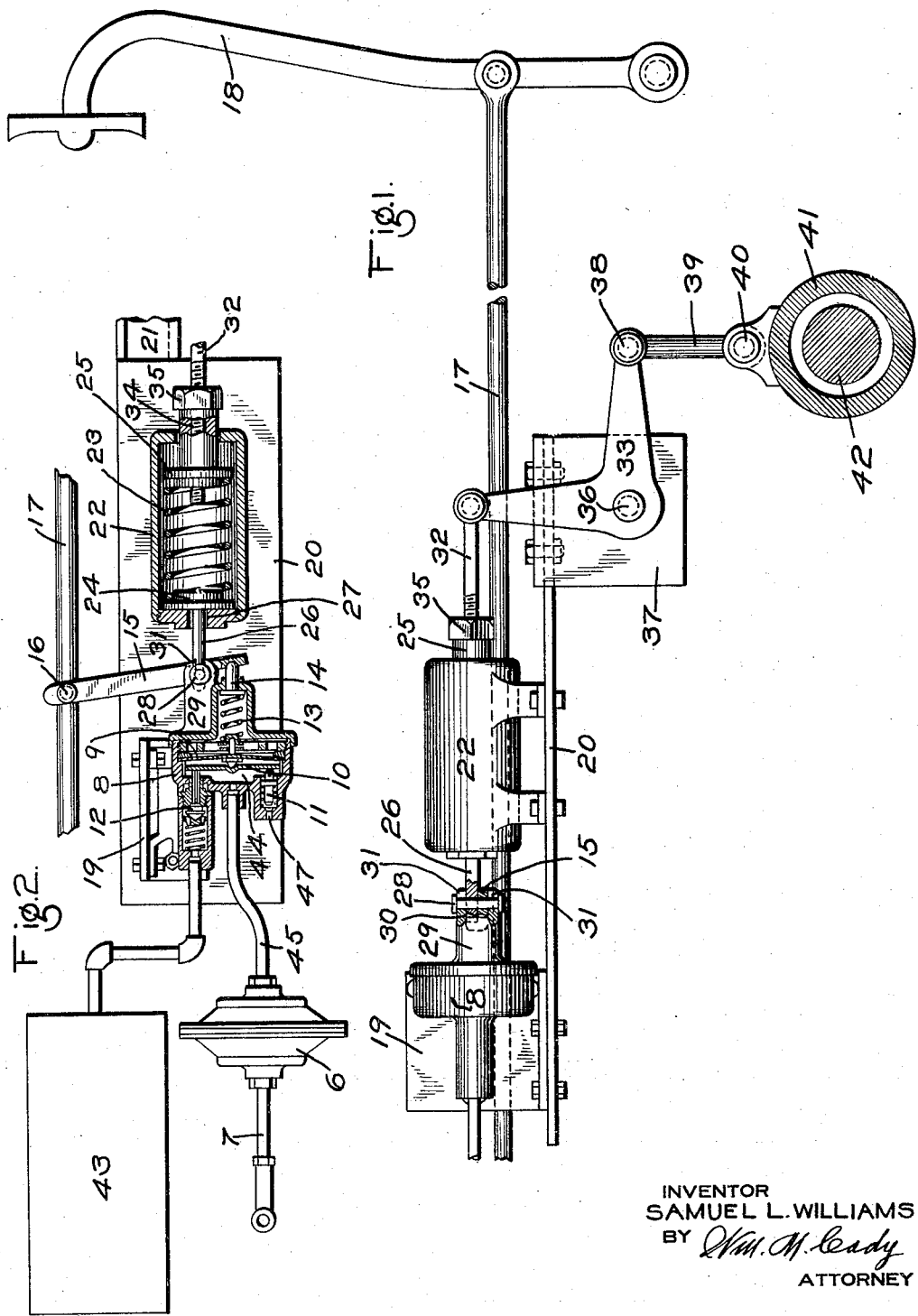

1,797,387

UNITED STATES PATENT OFFICE

SAMUEL L. WILLIAMS, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA

VARIABLE-LOAD BRAKE

Application filed May 11, 1929. Serial No. 362,370.

This invention relates to brakes, and more particularly to fluid pressure actuated brake equipment for automotive vehicles.

An object of the invention is to provide a fluid pressure actuated brake apparatus for automotive vehicles in which the maximum power with which the brakes may be applied is varied according to the load on the vehicle.

Another object of the invention is to provide improved means for regulating the fluid pressure in an automotive vehicle fluid pressure brake equipment according to variations in the load on the vehicle.

Another object of the invention is to provide an improved variable load brake apparatus of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing; Figure 1 is a diagrammatic view of a load brake equipment embodying the invention; and Fig. 2 is a plan, partly in section, of a portion of the equipment shown in Fig. 1, showing the same connected to the brake chamber and to the fluid pressure reservoir.

Automotive vehicles equipped with fluid pressure brake apparatus are usually provided with a lap type brake valve which is operated by the brake pedal lever to control the flow of fluid under pressure to or from the brake chambers. The construction of the brake valve is such that a given movement of the brake pedal causes a corresponding fluid pressure increase or decrease in the brake chambers.

It is obvious that under these conditions it is necessary for the vehicle operator to exercise judgment as to the maximum pressure which should be built up in the brake chambers for braking purposes, this judgment being based primarily on the load on the vehicle. When the load on the vehicle is increased, the brake chamber fluid pressure should also be proportionately increased so as to increase the braking force.

The lap type brake valve may be provided with a flexible member subject on one side to the pressure of a spring and on the opposite side to the brake chamber fluid pressure. The flexible member is adapted to operate a fluid supply valve and an exhaust valve. When the pressure on the spring side of the flexible member is less than the pressure on the valve side of said member, the supply valve is closed and the exhaust valve is open. However, when the spring pressure is increased, the flexible member is moved to unseat the supply valve and seat the exhaust valve. When the supply valve is thus unseated, fluid under pressure is supplied to the brake chambers until the brake chamber pressure overbalances the spring pressure, whereupon the flexible member is moved by the fluid pressure in a direction away from the supply valve, thereby permitting said supply valve to seat. Since the exhaust valve remains seated, the fluid under pressure in the brake chambers is bottled up, and the brakes are held applied.

Heretofore, the brake valve device could be manipulated to supply fluid to the brake chambers up to the maximum pressure of fluid available according to the degree to which the spring was compressed, regardless of whether the vehicle was loaded or unloaded, but according to the present invention means are provided for limiting the degree to which the spring may be compressed, as the load on the vehicle is varied.

Obviously, if the degree to which the valve spring may be compressed is increased in proportion as the load is increased, then it will require a corresponding increase in brake chamber pressure to overbalance the spring pressure, and accordingly the maximum pressure of brake chamber fluid is also increased.

For the purpose of regulating the compression of the brake valve spring, a manually operated member having a movable fulcrum is provided, together with yielding means for opposing the movement of said member, and means for varying the pressure of the yielding means on the member according to the load on the vehicle.

Referring to the drawing, the brake equipment may comprise one or more brake chambers 6 (only one being shown in the instant case), each brake chamber containing a flexible diaphragm (not shown) adapted to be operated by fluid under pressure for projecting a push rod 7. The push rod 7 may be connected to the rigging (not shown) through which the brakes of the automotive vehicle are applied and released.

For controlling the fluid pressure brakes, a valve device may be provided comprising a casing 8 having a diaphragm chamber containing a flexible diaphragm 9. The diaphragm 9 carries a member 10 which engages the stem of an exhaust valve 11 and the stem of a supply valve 12, for controlling said valves upon movement of the diaphragm.

A spring 13 acts on the opposite side of the diaphragm 9 and engages a spring pin 14 which in turn engages a lever 15.

The lever 15, at its opposite end, is connected by a pin 16 to a rod 17 which in turn is connected to the brake pedal lever 18 of the vehicle.

The brake valve casing 8 is mounted on a bracket 19 fixed to a plate 20 carried by a portion of the vehicle frame 21.

Also mounted on the plate 20 is a cylinder 22 containing an expansible coil spring 23.

One end of the spring 23 bears against the head of a plunger 24, while the opposite end of said spring bears against the head of a plunger 25. The plungers 24 and 25 are mounted for longitudinal movement in the cylinder 22.

The plunger 24 has a stem 26 which projects through an opening 27 in the end wall of the cylinder 22 and is connected by a pin 28 to the lever 15.

The casing 8 of the brake valve device is provided with an extension 29 which projects toward the end of the cylinder 22, and the extremity of the extension 29 is bifurcated to provide a slot 30 for receiving the lever 15 and the end of the plunger stem 26. The portions of the extension 29 above and below the slot 30 are notched, as at 31, to permit limited longitudinal movement of the pin 28, and the parts carried thereby, for a purpose to be hereinafter more fully described.

The plunger 25 is adjustably mounted on a rod 32 pivotally connected to one arm of a bell crank lever 33. The plunger 25 is formed with a longitudinally threaded bore 34 through which extends a correspondingly threaded portion of the rod 32. The threaded portion of the rod 32 carries a jam nut 35 for locking the plunger 25 in adjusted position on the rod.

The bell crank lever 33 is fulcrumed, by means of a pin 36, to a bracket 37 depending from the plate 20, and the other arm of said lever is pivotally connected by a pin 38 to a link 39. The opposite end of the link 39 is connected by means of a pin 40 to the housing 41 of the vehicle axle 42.

Assuming that the vehicle is lightly loaded, if it is desired to apply the brakes, the pedal lever 18 is depressed by the foot of the operator, causing a forward movement of the pull rod 17. In this forward movement of the pull rod 17, the lever 15 is swung on the fulcrum provided by the pin 28 and the short arm of the lever depresses the pin 14, compressing the spring 13.

The diaphragm 9 is then operated by the pressure of the spring 13 to close the exhaust valve 11 and open the supply valve 12. Fluid under pressure from a reservoir 43 is then admitted to diaphragm chamber 44 and from thence flows through pipe 45 to the brake chamber 6. The diaphragm in the brake chamber 6 is thereupon operated to project the push rod 7 in the usual manner to effect the application of the brakes.

When the pressure of the fluid in diaphragm chamber 44 increases a predetermined amount, the diaphragm 9 will be flexed outwardly against the pressure exerted by spring 13, and assuming that the pedal lever 18 is being gradually depressed by the operator, the rod 17 will pull the end of the long arm of the lever 15 toward the right.

The pressure of the spring 13 may be varied by the operator actuating the foot pedal lever 18 up to the point where the pressure required to further compress the spring 13 exceeds the pressure required to compress spring 23.

When the vehicle is lightly loaded, the spring 23 exerts a light pressure on the plunger 24, and consequently continued forward movement of the pedal lever 18 will move the pin 28 outwardly of the notches 31, causing a corresponding movement of the plunger 24 against the pressure of spring 23. Therefore, the fulcrum of the lever 15 will be transferred from the pin 28 to the point at which the end of the pin 14 engages the short arm of the lever. With the pin 28 thus withdrawn from the bottom of the notches 31, the pressure of spring 23 will be transmitted through the plunger 24, stem 26, short arm of lever 15, and pin 14, to increase the pressure of spring 13.

Therefore, when the pressure of the fluid in the brake chamber 6 and diaphragm chamber 44 increases an amount sufficient to overbalance the combined pressures exerted by springs 13 and 23, the diaphragm will be flexed outwardly an amount sufficient to permit the supply valve 12 to seat, thereby cutting off the supply of fluid under pressure from the reservoir 43.

The pedal lever 18 may be further depressed to further compress the spring 13, so as to operate the diaphragm 9 and thereby cause fluid under pressure to be again supplied to the brake chamber 6 in the manner hereinbefore described, and this process may be repeated until no further compression of the springs can be effected.

When the brake chamber pressure exceeds the maximum pressure of the springs permitted according to the load, the supply valve 12 will be seated in the manner heretofore described so as to cut off the fluid supply, and in as much as the exhaust valve 11 will remain seated, the fluid under pressure will be retained in the brake chamber 6 until it is desired to release the brakes.

The brakes may be released by relieving the foot pressure on the pedal lever 18 so that the compression of the springs 13 and 23 being reduced, the diaphragm 9 will be moved by the brake chamber pressure acting on the opposite side to open the exhaust valve 11 and thereby permit the exhaust of fluid from the brake chamber through the open exhaust port 47.

When the vehicle is lightly loaded, the frame 21 and the parts carried thereby, will be so supported relative to the axle housing 41, by the usual vehicle springs, that the plunger 25, through the rod 32, bell crank lever 33 and link 39, only slightly compresses the spring 23 against the plunger 24. The position of the plunger 25 for this purpose can be adjusted by the means heretofore referred to, so that the pressure of spring 23 will act to limit the maximum pressure of fluid which can be supplied to apply the brakes. It will be understood, however, that this pressure is considerably less than the maximum pressure which should be available to apply the brakes when the vehicle is heavily loaded.

Therefore, when the load on the vehicle is increased, the additional weight will move the frame 21 and the parts carried thereby, nearer to the axle housing 41, due to the deflection of the vehicle springs. Consequently the fulcrum 36 of the bell crank lever 33 will be moved downwardly a corresponding distance. This movement will shift the position of the arms of the bell crank lever 33 relative to the cylinder 22 so that the plunger 25 is moved toward the plunger 24, further compressing the spring 23.

In this way, an increase in load on the vehicle causes a corresponding increase in the compression of spring 23. As the pressure of spring 23 is transmitted through the plunger 24, stem 26, short arm of the lever 15 and the spring pin 14, to the spring 13, the pressure exerted by the latter spring against the diaphragm 9 will also be increased a proportionate amount when the lever 15 is operated to effect an application of the brakes.

Assuming that the vehicle is heavily loaded and the compression of the spring 23 has been correspondingly increased, when the diaphragm 9 is actuated in the manner heretofore described to unseat the supply valve 12, it will require a greater amount of fluid pressure in chamber 44 to overbalance the combined pressures exerted by springs 13 and 23, than is the case when the vehicle is lightly loaded, since it will require a greater force acting on the diaphragm 9 from the side opposite to the spring 13, to flex the diaphragm away from the stem of the supply valve 12 an amount sufficient to permit the supply valve to seat in the manner heretofore described so that the supply of fluid under pressure from the reservoir 43 to the brake chamber 6 is cut off.

It will thus be seen that the maximum pressure of fluid supplied to apply the brakes is limited according to the load on the vehicle, the maximum pressure limit being varied as the load on the vehicle is varied.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a load regulated brake, the combination with a brake chamber, valve means for regulating the fluid under pressure supplied to the brake chamber, said valve means being subject on one side to the pressure of a spring and on the opposite side to fluid pressure, means for compressing the spring so as to actuate said valve means to admit fluid under pressure to the brake chamber, and flexible means for amplifying the power of the spring according to the load on the vehicle.

2. In a load brake apparatus, the combination with a brake chamber, of valve means subject on one side to the pressure of a spring and on the opposite side to fluid pressure, for regulating the fluid under pressure supplied to the brake chamber, said valve means being actuated when the brake chamber pressure overbalances the spring pressure to cut off the supply of fluid to the brake chamber, a lever for compressing the valve spring, means for actuating the lever, and pressure means acting on the lever for varying the force thereof against the valve spring according to the load on the vehicle.

3. In a load brake device, the combination with a brake chamber, valve means for regulating the fluid under pressure supplied to the brake chamber, said valve means being subject on one side to the pressure of a spring and on the opposite side to fluid pressure, the supply of fluid under pressure being cut off to the brake chamber when the brake chamber pressure overbalances the pressure of the spring, means for compressing the spring so as to establish communication to the brake chamber, a second spring opposing movement of the valve spring actuating means, and means for varying the pressure of said second spring according to the load on the vehicle.

4. In a load regulated brake, the combination with a brake chamber, of valve means subject on one side to the pressure of a spring and on the opposite side to fluid pressure, for regulating the fluid under pressure supplied to the brake chamber, said valve means being actuated when the brake chamber pressure overbalances the pressure of the spring to cut off the supply of fluid to the brake chamber, a member for compressing the spring, and flexible means acting on the member for varying the pressure of the valve spring according to the load on the vehicle.

5. In a load regulated brake, the combination with a brake chamber, of valve means subject on one side to the pressure of a spring for regulating the fluid under pressure supplied to the brake chamber, said valve means being actuated when the brake chamber pressure overbalances the pressure of the spring to cut off the supply of fluid to the brake chamber, means for compressing the valve spring, and a second spring acting on said means for varying the force exerted by said means against said valve spring according to the load.

6. In a load regulated brake, the combination with a brake chamber, of valve means subject on one side to the pressure of a spring for controlling the fluid under pressure supplied to the brake chamber, means for compressing the valve spring, said means having a movable support, a plunger bearing at one end against said support and at the other end against a second spring, a second plunger bearing against the opposite end of the second spring, and means for varying the relative position of said second plunger so as to vary the compression of said second spring according to the load.

7. In a vehicle brake equipment, the combination with means for varying the braking power in proportion to the pressure applied thereto, and a manually operated member for varying the pressure applied to said means, of yielding means for opposing movement of said member to vary the pressure applied, and means for varying the pressure of said yielding means on said member according to the load on the vehicle.

8. In a vehicle brake equipment, the combination with means for varying the braking power in proportion to the pressure applied thereto, and actuating means for varying the pressure applied to said means, of yielding means for opposing movement of said actuating means.

9. In a vehicle brake equipment, the combination with means for varying the braking power in proportion to the pressure applied thereto, and actuating means for varying the pressure applied to said means, of yielding means for opposing movement of said actuating means, and means for varying the pressure of said yielding means on said actuating means according to the load on the vehicle.

10. In a vehicle brake equipment, the combination with means for varying the braking power in proportion to the pressure applied thereto, and a member for varying the pressure applied to said means, of yielding means for opposing movement of said member, and means for varying the pressure of said yielding means according to the load on the vehicle.

11. In a vehicle brake equipment, the combination with means for varying the braking power in proportion to the pressure applied thereto, a spring for applying pressure to said means, and a member for compressing said spring, of a second spring for opposing movement of said member to compress the first spring, and means for varying the pressure of the second spring according to the load on the vehicle.

In testimony whereof I have hereunto set my hand, this 7th day of May, 1929.

SAMUEL L. WILLIAMS.